Sept. 8, 1936. C. N. TEETOR 2,053,384
PISTON RING AND EXPANDER STRUCTURE
Filed July 25, 1935
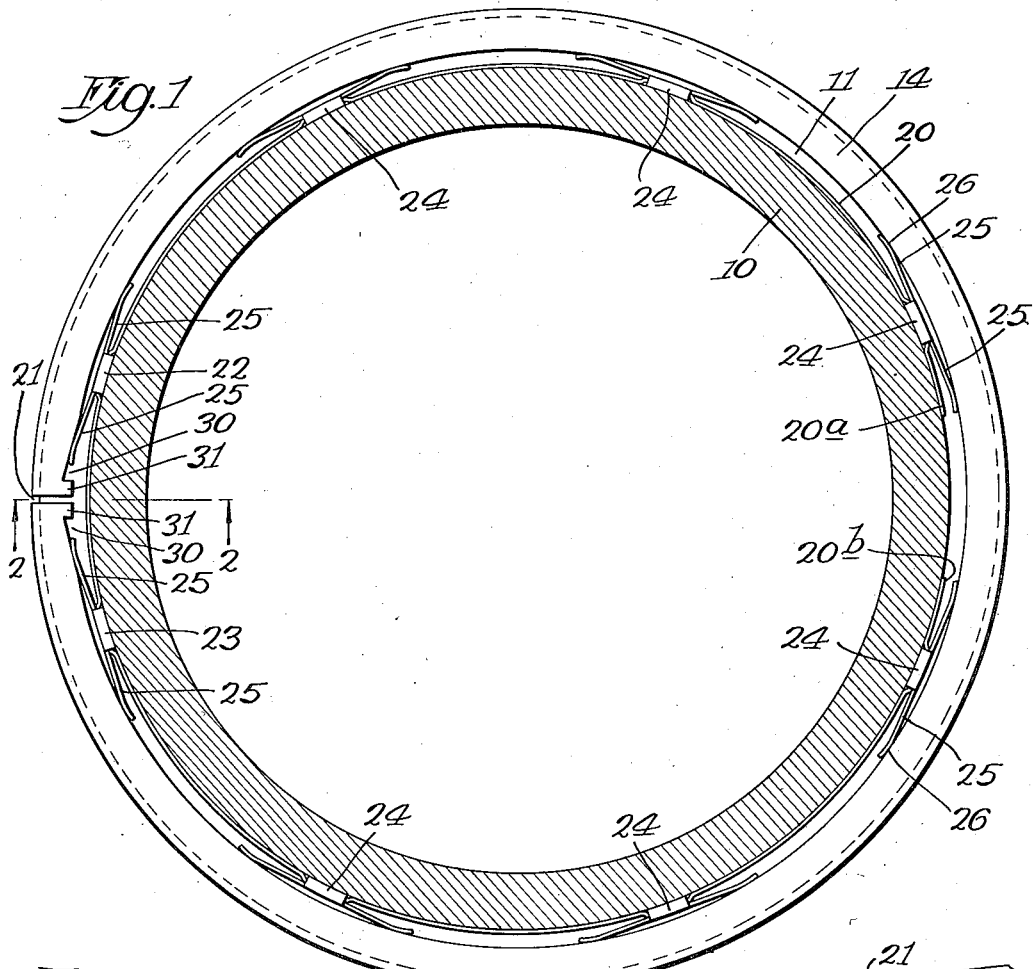
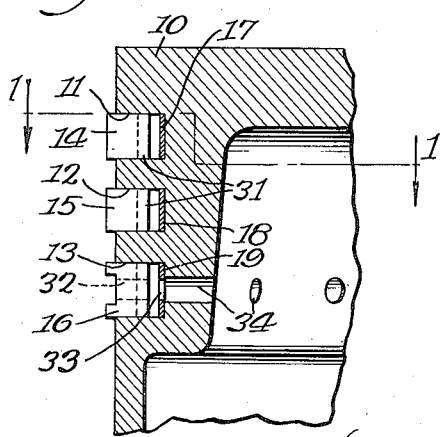
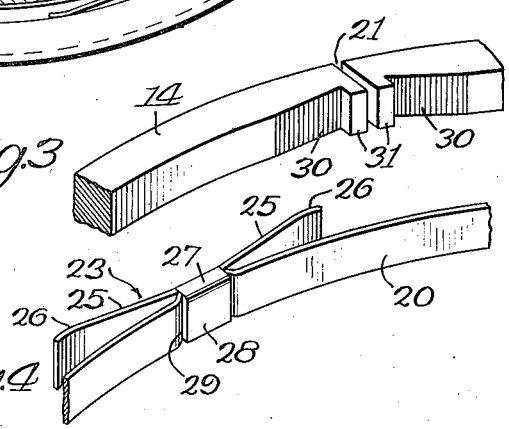
Inventor:
Charles N. Teetor
By Davis, Macauley, May, Lindsey & Smith Attys.

Patented Sept. 8, 1936

2,053,384

UNITED STATES PATENT OFFICE 2,053,384

PISTON RING AND EXPANDER STRUCTURE

Charles N. Teetor, Hagerstown, Ind., assignor to The Perfect Circle Company, Hagerstown, Ind., a corporation of Indiana Application July 25, 1935, Serial No. 33,024

7 Claims. (Cl. 309—43)

My invention relates to piston ring structure for internal combustion engines and the like, and it has to do more particularly with piston rings and expanders mounted in the piston ring grooves and adapted to augment the expanding action of the piston rings.

One of the objects of my invention is to provide an improved structure of the foregoing character.

Another object is to provide improved means for preventing relative movement between the piston ring and expander thereby maintaining desired relative positions of the ring and expander and insuring the same ring-expanding effect at all times.

A more specific object is to provide an improved ring and expander assembly wherein the expander includes a plurality of spring elements adapted to engage the inner surface of the ring and exert the desired pressure thereon to cause it to engage the cylinder wall with the correct pressure, the inner surface of the ring adjacent and on opposite sides of the joint thereof being provided with notches in which the ends of the adjacent spring elements engage and prevent relative movement between the ring and expander.

Other objects and advantages will become apparent as this description progresses and by reference to the drawing wherein,—

Figure 1 is a sectional top plan view of one form of piston structure embodying my invention, which view is taken substantially on line 1—1 of Fig. 2;

Fig. 2 is a sectional elevation taken substantially on line 2—2 of Fig. 1;

Fig. 3 is a fragmentary perspective view of the piston ring shown in Fig. 1; and Fig. 4 is a fragmentary perspective view of the expander shown in Figs. 1 and 2.

I have shown my invention as applied to a piston 10 having grooves 11, 12 and 13 (Fig. 2) therein for the reception of rings 14, 15 and 16, respectively. Piston ring expanders 17, 18 and 19 are also mounted in the respective grooves 11, 12 and 13, for expanding the rings into proper engagement with the cylinder wall (not shown).

Referring particularly to piston ring expander 17, it includes a supporting band 20 formed of any suitable material such, for example, as spring steel, soft steel, and the like. The supporting band 20 is mounted in the ring groove with its free ends 20ª and 20ᵇ located opposite the ring joint 21 (Fig. 1). The length of the band 20 is slightly less than the circumference of the bottom of the ring groove, and its width is substantially the same as the width of the ring.

The band 20 supports a plurality of spring members 22, 23 and 24 (Figs. 1 and 4), each formed of spring steel and having a pair of oppositely-directed spring leaves or elements 25 of substantially the width of and overlying the outer surface of the band 20 and having curved contact points 26 which freely engage the inner surface of the piston ring 14. The spring leaves or elements 25 of each spring member are supported by a clip portion 27 which has a spring clip member 28 adapted to seat within a pocket 29 in the band 20. The pocket 29 is, preferably, formed by pressing the band outwardly to a depth substantially equal to the thickness of the spring clip member 28 so that the latter seats in the pocket substantially flush with the inner surface of the band 20. By pressing the band outwardly to form the pocket, there is provided a raised seat of substantial area on the outer face of the band upon which the clip portion 27 of the spring member seats and which serves as a fulcrum about which the spring leaves 25 move. It will be understood that while good results are obtained in the use of a supporting band and spring members of the foregoing kind, I do not desire to be limited to such structure since excellent results may be obtained with other band-and-spring arrangements, whether they be formed from a single piece of material or from separate pieces, as shown.

The spacing of the ring contact points 26 (Fig. 1) of the spring members around the ring 14 provides the desired ring expanding action, and the spring members 22 and 23 adjacent the ring joint 21 are located closer together than the other spring members to accommodate the greater flexibility of the ring adjacent its joint 21, so that the proper expanding action is applied directly at the free ends of the ring. It is desired that this preferable relationship of the ring and the expander be maintained and, to that end, I provide means for maintaining the piston ring and expander in substantially fixed relationship with respect to each other.

More particularly, referring to the ring 14, I provide reversed notches 30 on the inner surface of the ring 14 adjacent and on opposite sides of the joint 21 thereof. In this way, inwardly-extending radial lugs or stops 31 are formed on opposite sides of the ring joint directly at (and constituting a part of) the free ends of the ring. The notches 30, when the expander and the ring are assembled, receive the ends of the adjacent spring leaves 25 of the spring members 22 and 23 and the ends of these leaves are adapted to abut the lugs or stops 31 as the ring tends to rotate, thereby preventing any substantial rotation of the ring in either direction relative to the expander. A very slight clearance is, preferably, provided between the stops 31 and the ends of the adjacent spring leaves engaged in the notches 30, this clearance being only sufficient to permit the intended free and normal slide movement of the spring leaves against the piston ring within the notches 30 as the intended expanding action takes place.

The ring 15 and the expander 18 are of the same construction as the ring and the expander above described. The ring 16, however, is of a ventilated type, having oil drain slots 32 therein. The expander 19 used with this ring is provided with suitable openings 33 through which oil may drain into the piston openings 34 and thence into the crank case.

I believe that the operation and advantages of my invention will be well understood from the foregoing. During the operation of the engine, each spring leaf operates independently of the others and with a minimum of friction so that the proper contact between the ring and cylinder wall surface is accomplished even though out-of-round conditions exist therein. Once the expander is applied and the desired positions of the parts accomplished, this relationship is maintained between the piston ring and the expander. In this way, the ring is expanded throughout in such a way and to such an extent as to maintain at all times the intended pressure relationship between the piston ring and the cylinder wall.

It will also be appreciated from the foregoing that the form of the expanders and rings may be varied without departing from this invention as defined in the claims hereinafter set forth. For example, without limiting the foregoing generality, the position of the notches 30, one or both of them, may be varied so as to cooperate with other of the spring elements of the expander. The ring expanders may take various forms, including those in which the spring members are mounted in different ways and also an expander arrangement wherein the supporting band and spring members are formed integrally.

I claim:

1. The combination of a piston ring and expanding means adapted for use in a ring groove of the piston, the expanding means being mounted within said ring and including a plurality of spring members each embodying a spring element having an end portion in free engagement with the inner surface of said ring, the inner surface of said ring being provided with circumferentially-spaced notches located to receive the end portions of at least two of said spring elements, said notch-received spring elements being also adapted to abut-engage the notched surface of the ring in opposite directions to maintain said ring and expanding means in a substantially fixed relationship.

2. The combination of a piston ring and expanding means adapted for use in a ring groove of a piston, the expanding means being mounted within said ring and including a plurality of spring members each embodying a spring element having free engagement with the inner surface of said ring, and said ring having a pair of stop elements formed on the inner surface of said ring, said stop elements being located adjacent two of said spring elements so that the former are adapted to be oppositely engaged by said two spring elements whereby said ring and expanding means are substantially held against relative rotation.

3. The combination of a piston ring and expanding means adapted for use in a ring groove of a piston, the expanding means being mounted within said ring and including a plurality of spring members each embodying a spring element having free engagement with the inner surface of said ring, the spring members adjacent the ring joint being located closer together than the other of said spring members so that the spring elements thereof expandingly engage the ring on opposite sides of the joint thereof closely adjacent thereto, and stop members formed on the inner surface of said ring on the opposite sides of the joint thereof and adapted to be engaged by the ends of the adjacent of said spring elements to maintain the foregoing positions of said ring and expanding means relative to each other.

4. The combination of a split piston ring and expanding means adapted for use in a ring groove of a piston, the expanding means being mounted within said ring and including a plurality of spring members each embodying a spring element having free engagement with the inner surface of said ring, the spring members adjacent the split of the ring being located closer together than the other of said spring members so that the spring elements thereof expandingly engage the ring on opposite sides of the split thereof closely adjacent thereto, and inwardly extending stop members formed on the inner surface of said ring directly at the ring split so that as said ring and expanding means tend to rotate relatively to each other the ends of the spring elements next adjacent the ring split oppositely abut said stop members substantially preventing movement of said ring and expanding means relative to each other in either direction.

5. The combination of a piston ring split to provide free ends, and expanding means adapted for use in a ring groove of a piston, the expanding means being mounted within the ring and including a plurality of spring members each having oppositely extending spring elements which freely engage the inner surface of said ring to expand the same, the inner surface of said ring next to each free end thereof being provided with notches, two of said spring members being located closely and adjacent to and on opposite sides of the ring split so that the ends of the ring elements thereof adjacent to said notches engage in the respective notches maintaining said ring and expanding means in substantially fixed position relative to each other.

6. The combination of a split piston ring and expanding means adapted to be used in a ring groove of a piston, the expanding means being mounted within said ring and including a supporting band and a plurality of spring arms on the band and in free expanding engagement with the inner surface of said ring, the inner surface of said ring on the opposite sides of and adjacent to the split of the ring being provided with notches, one wall of each of which extends diagonally from the inner surface of the ring toward the ring split while the other wall extends inwardly, two of said spring arms being located adjacent said notches and freely engaging the diagonal walls of said notches and also adapted to abut-engage the inwardly extending walls of said notches as the ring and expanding means tend to rotate relative to each other.

7. The combination of a piston ring and expanding means adapted for use in a ring groove of a piston, the expanding means being mounted within the ring and including a supporting band and a plurality of circumferentially spaced spring leaves overlying the supporting band, the spring leaves frictionally engaging the inner surface of said ring to expand the latter, and the ring having two notches with one wall of each notch extending inwardly to provide an abutting face and the other wall extending diagonally to the inner surface of the ring to provide a bearing surface, two of the spring leaves extending oppositely to each other and freely engaging said bearing surfaces and adapted to engage said abutting faces as the ring and expanding means tend to rotate toward each other, only one abutting face being engaged at a time.

CHARLES N. TEETOR.